United States Patent [19]

Ito

[11] Patent Number: 5,148,447
[45] Date of Patent: Sep. 15, 1992

[54] CONTROL DEVICE IN TRANSCEIVER

[75] Inventor: Koichi Ito, Hino, Japan

[73] Assignee: Kabushiki Kaisha Toshiba, Kawasaki, Japan

[21] Appl. No.: 249,755

[22] Filed: Sep. 27, 1988

[30] Foreign Application Priority Data

Sep. 30, 1987 [JP] Japan .................................. 62-246782

[51] Int. Cl.⁵ .............................................. H04B 1/38
[52] U.S. Cl. .......................................... 375/7; 375/1; 328/83
[58] Field of Search .............. 375/1, 115, 7, 8, 45; 370/107; 367/42; 364/484; 340/825.7, 825.63; 328/83

[56] References Cited

U.S. PATENT DOCUMENTS

| | | | |
|---|---|---|---|
| 3,582,783 | 6/1971 | Melv | 375/45 |
| 3,701,103 | 10/1972 | Padgett et al. | 340/825.7 |
| 3,872,437 | 3/1975 | Cross | 340/825.63 |
| 4,047,107 | 9/1977 | Dickinson | 340/825.63 |
| 4,049,956 | 9/1977 | Van Veen | 371/21 |
| 4,135,243 | 1/1979 | Peregrino et al. | 364/484 |
| 4,168,485 | 9/1979 | Payton et al. | 367/42 |
| 4,311,986 | 1/1982 | Yee | 340/825.63 |
| 4,517,679 | 5/1985 | Clark et al. | 375/115 |
| 4,600,942 | 7/1986 | Field et al. | 380/14 |
| 4,642,647 | 2/1987 | Sturza et al. | 375/115 |

FOREIGN PATENT DOCUMENTS

163313 12/1985 European Pat. Off. .
2128828 5/1984 United Kingdom .

Primary Examiner—Stephen Chin
Attorney, Agent, or Firm—Finnegan, Henderson, Farabow, Garrett and Dunner

[57] ABSTRACT

A control device in a transceiver suppresses the generation of unnecessary frequency components which takes place when predetermined control steps are repetitively executed under the control of a clock signal. The repetitive period of the predetermined control steps is intentionally controlled not to become constant.

15 Claims, 8 Drawing Sheets

CONTROL DEVICE IN TRANSCEIVER

BACKGROUND OF THE INVENTION

1. Field of the Invention

The present invention relates to control devices in transceivers and, more particularly, to a control device in a transceiver which is designed to suppress the unnecessary radiation of frequency signals resulting from control steps repeated at a constant period to thereby realize a good quality of communication.

2. Description of the Related Art

Figure 8:
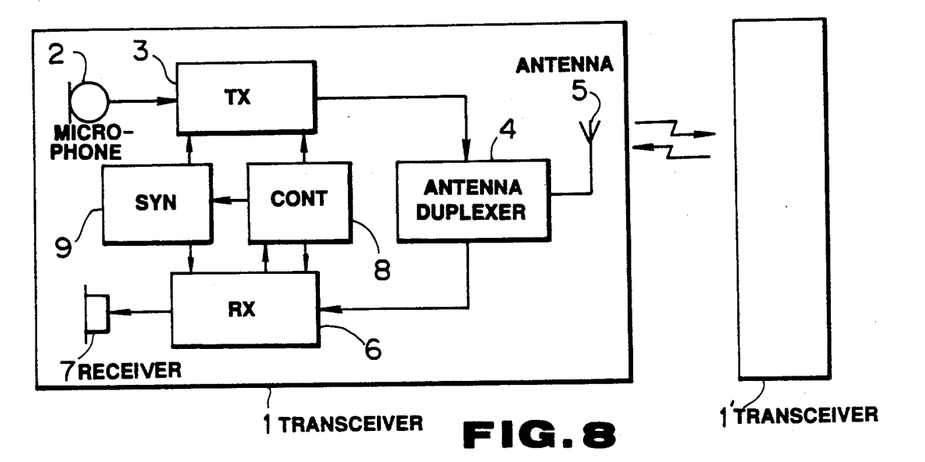
FIG. 8 is a block diagram showing a general arrangement of an ordinary transceiver.

There is shown a general arrangement of a transceiver 1 in FIG. 8 in which a voice signal produced at a microphone 2 of the transceiver 1 is modulated at a transmitter 3 and then sent through an antenna duplexer 4 to an antenna 5 to be transmitted from the antenna to a partner transceiver 1' in the form of electromagnetic or radio waves.

On the other hand, the transceiver 1, when receiving radio waves transmitted from the transceiver 1' at the antenna 5, sends them through the antenna duplexer 4 to a receiver 6 where the radio waves are demodulated to an original voice signal that is then supplied to a receiver 7 such as loudspeaker or an ear receiver.

A control circuit 8 in the transceiver 1 acts to perform control for establishing a radio communication circuit between the transceivers 1 and 1'.

A synthesizer 9 is also provided in the transceiver 1 to generate a frequency signal that determines a radio channel frequency on the basis of the channel assignment of the control circuit 8.

The arrangement and operation of the transceiver 1' are exactly the same as those of the transceiver 1.

In the meantime, recent tendency of transceivers is that an increasing number of functions including, for example, multi-channel access and the like involve the complicated control of the radio communication circuit, with the result of a complicated control procedure.

In order to cope with such circumstances, a microprocessor (which will be referred to merely as MCU, hereinafter) has been incorporated in the control circuit 8. An example of the arrangement of such a control circuit is shown in FIG. 9.

Figure 9:
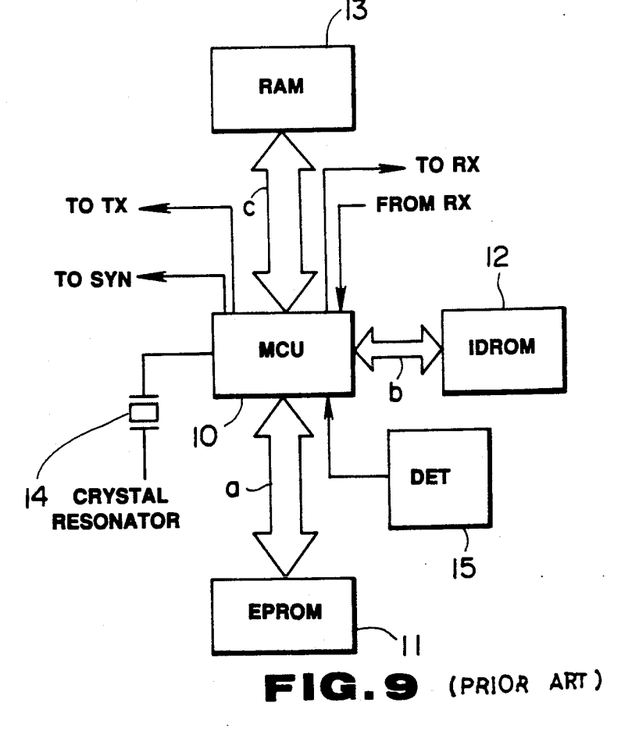
FIG. 9 is a block diagram showing an arrangement of a prior art control device in this sort of transceiver.

The control circuit of FIG. 9 comprises an MCU 10 as a nucleus, an EPROM 11 for storing therein a control program, an IDROM 12 for storing therein individual identification codes for respective transceivers, a RAM 13 for temporarily storing therein information on control, a crystal resonator 14 for generating a reference clock frequency for the MCU 10, a detection circuit 15 for performing various detections including, for example, the detection of a power source voltage, the MCU 10 being connected to the EPROM 11, IDROM 12 and RAM 13, respectively, by means of data buses a, b and c.

These data buses a, b and c are operated at all times on an operational clock frequency $f_o$ of the MCU 10.

Figure 10:
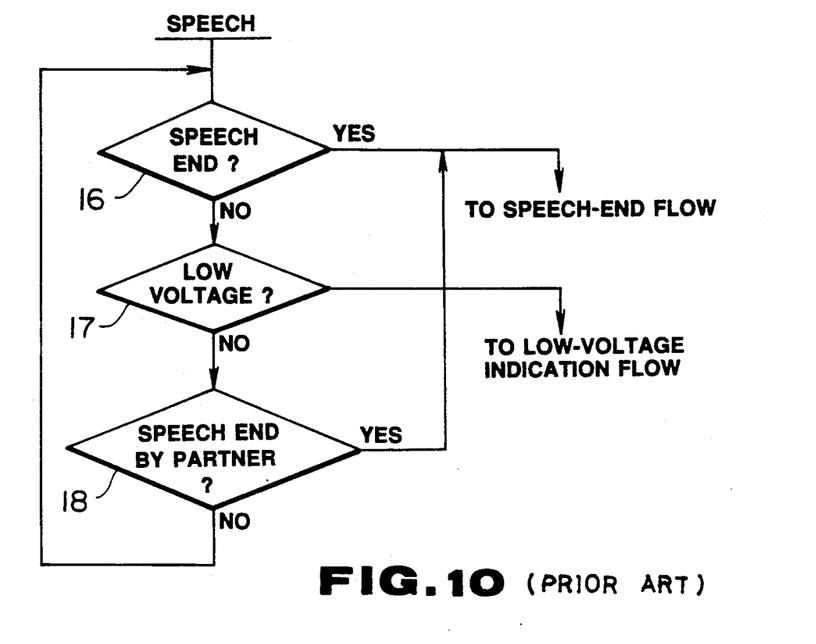
FIG. 10 is a flowchart showing an example of the processing operation of the prior art transceiver control device.

The control operation of the control circuit 8 having such an arrangement is shown, as an example, by a flowchart in FIG. 10.

More in detail, in the exemplary flowchart of FIG. 10, the control circuit 8 sequentially judges whether or not to cause such a speech ending means as a switch (not shown) to terminate the conversation in a speech mode (step 16), whether or not to provide a low-voltage indication on the basis of a detection signal received from the detection circuit 15 (step 17), and whether or not to terminate the conversation on the basis of a speech-end request signal transmitted from the partner transceiver 1' (step 18), and then executes, on the basis of the corresponding judgement result, such control as to transfer to the associated speech end flow or low-voltage indication flow.

At this time, if the conversation is normally maintained, then the control circuit 8 executes repetitively the processings from the step 16 to the step 18.

The control processing time for only one cycle from the step 16 through the step 17 to the step 18, which time is determined by the number of program steps, is constant.

That is, such control steps are executed at intervals of a constant period T, during which the control program data is repetitively read at the period T out of the EPROM 11 through, for example, the data bus a connected between the MCU 10 and the EPROM 11. This means that a series of pulses, which has the operational clock frequency $f_c$ and flows through the data bus a, is AM-modulated at a period of T (sec) or at a frequency of 1/T. Thus, in this case, frequency spectra satisfying the following relationship between the operational clock frequency $f_c$ and its harmonics $nf_c$ will inevitably take place:

$$nf_c \pm m/T$$

where m and n denote respectively an integer.

Figure 11:
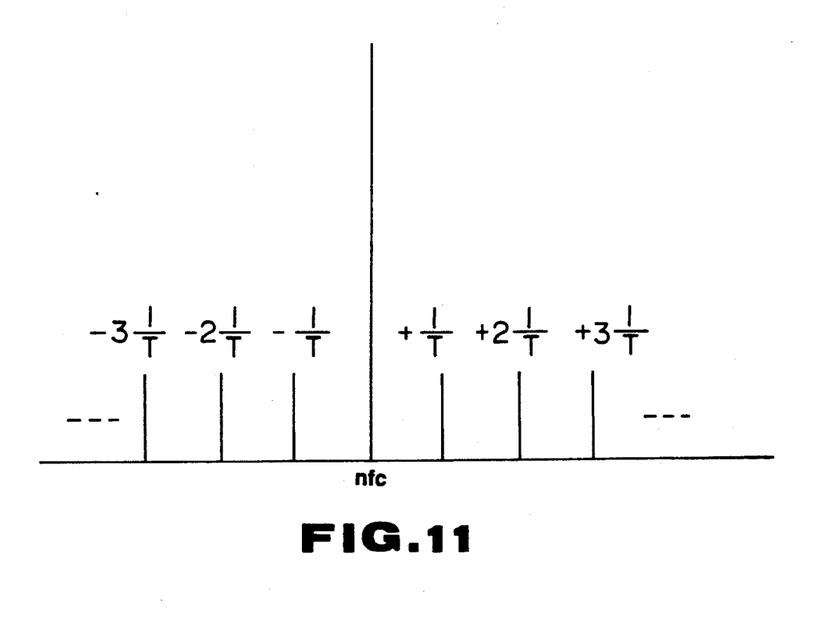
FIG. 11 is a diagram for explaining how frequency spectra take place under the prior art transceiver control device.

Such frequency spectra are illustrated in FIG. 11. As will be clear from the drawing, innumerable frequency spectra inevitably occur since the frequency 1/T is usually much smaller than the operational clock frequency $f_c$ (for example, $f_c = 4$ MHz and 1/T = 10 kHz).

The generation of such innumerable frequency spectra enhances the possibility of generating the same frequency as the radio communication channel and for example when radio waves receiving at the transceiver 1 are weak, this disadvantageously causes the generation of beat noise, thus making conversation difficult with the partner transceiver.

Such a disadvantage during wave reception of the transceiver will occur even during transmissive operation of the transceiver. That is, even in the transmission mode of the transceiver, such countless frequency spectra as mentioned above take place and act to increase the unnecessary radiation, with the result that the deterioration of communication quality cannot be avoided.

In this way, the prior art transceiver control circuit has had such a problem that, when the control circuit repetitively executes the control steps necessary for transmitting and receiving operations, this causes the generation of innumerable frequency spectra, which results in that the unnecessary radiation of noise such as typical beat noise during the wave reception takes place with the deteriorated communication quality.

In view of such circumstances, it is an object of the present invention to provide a control circuit in a transceiver which can reduce unnecessary noise radiation during transmitting and receiving operations to minimize the generation of beat noise and realize a good quality of communication.

SUMMARY OF THE INVENTION

In accordance with the present invention, there is provided a control device in a transceiver having at least a receiver, which control device has a clock source for generating a clock signal providing a reference of control operation and which repetitively executes predetermined control steps under the control of the clock signal generated at the clock source, and which comprises a period adjusting means for controlling a repetitive period of the predetermined control steps not to be constant.

The period adjusting means may include means for generating a random number and a means for changing the period of the predetermined control steps by a time corresponding to the random number generated by the random-number generating means.

The period changing means is provided at a predetermined location of the predetermined control steps or at a plurality of predetermined locations thereof.

The period adjusting means may also include a means for generating a value of a predetermined function and a means for changing the period of the predetermined control steps by a time corresponding to the function value generated at the function generating means.

The function generating means may, for example, comprises a means for counting the number of circulation times in the control steps to generate the predetermined function value as a variable of the count value of the counting means.

The function generating means may also include a means for counting the number of circulation times in the control steps and a means for resetting the function value to its initial value each time the count value of the counting means reaches a predetermined value.

The period adjusting means may also include a means for counting the number of circulation times in the control steps and a means for modifying the number of the predetermined control steps in accordance with the count value of the counting means or each time the count value reaches a predetermined value.

The step-number modifying means demands the step number by subtracting or adding a predetermined step from or to the predetermined control steps or by repeating the same step.

DESCRIPTION OF THE PREFERRED EMBODIMENTS

Embodiments of the present invention will be detailed by referring to the attached drawings.

Figure 1:
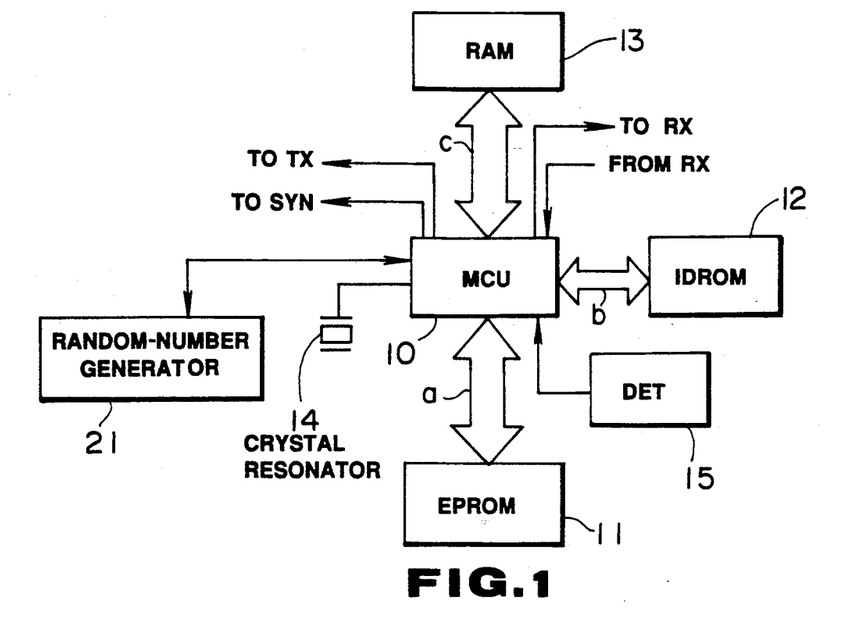
FIG. 1 is a block diagram showing an embodiment of a control device in a transceiver in accordance with the present invention.

Referring first to FIG. 1, there is shown a block diagram of an embodiment of a control device used in a transceiver in accordance with the present invention, in which parts having the same functions as those in the prior art control circuit shown in FIG. 9 are denoted by the same reference numerals. The control device in the transceiver in the present embodiment is different in arrangement from the prior art control circuit in that a random-number generator 21 is newly added as connected to the MCU 10.

Figure 2:
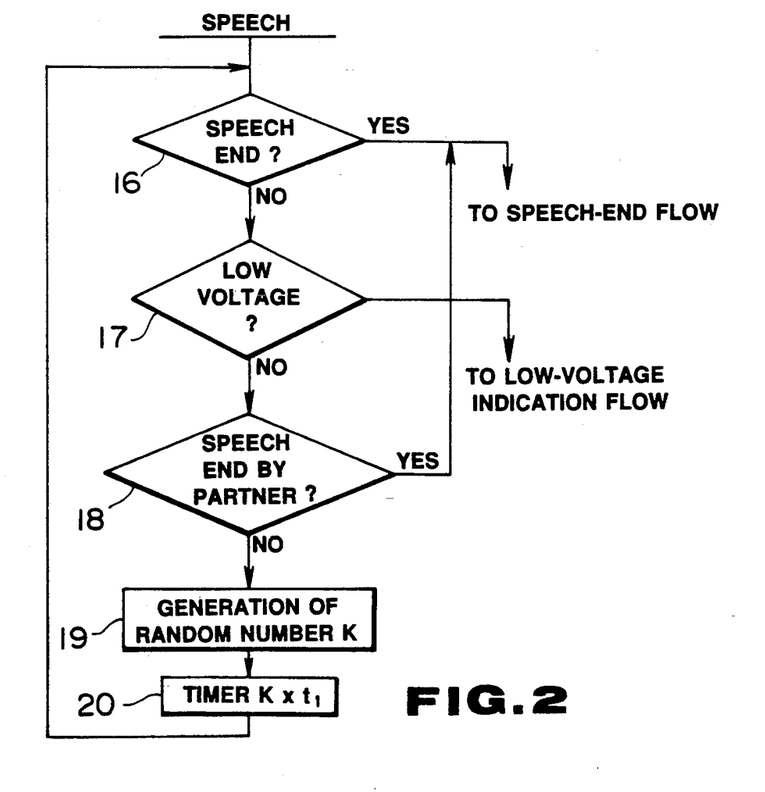
FIG. 2 is a flowchart showing an embodiment of the processing operation of the transceiver control device in accordance with the present invention.

The operation of the embodiment will next be explained in detail by referring to a flowchart of FIG. 2. In more detail, the operation shown by the flowchart in FIG. 2 includes the processings of the steps 16 to 18 in the operation of the flowchart of FIG. 10 and corresponds to the control steps which have been executed at a constant repetitive period in the prior art.

In the transceiver control device of the present embodiment, on the other hand, the processings of new steps 19 and 20 are added to provide a random repetitive period to the aforementioned control steps, i.e., to randomize the repetitive period of the aforementioned control steps.

The MCU 10 executes, as its basic control operation, the processings of the steps 16 to 18 while reading or writing data through the data buses a, b and c connected between the EPROM 11, IDROM 12 and RAM 13 therefrom or thereinto.

More specifically, the MCU 10 sequentially judges whether or not to cause such a speech ending means (not shown) as a switch to terminate the conversation in a speech mode (step 16), whether or not to provide a low voltage indication on the basis of a detection signal received from the detection circuit 15 (step 17) and whether or not to terminate the conversation on the basis of a speech end request signal transmitted from the partner transceiver (step 18), and then transfers to the corresponding speech end flow or low voltage indication flow on the corresponding judgement result.

At this time, if the speech is normally maintained, then the MCU 10 repetitively executes the same processings of the steps 16 to 18.

Under such a condition, when the MCU 10 has executed the processing of the step 18 and the random number generator 21 generates a random number k (step 19), the MUC 10 enters the random number k.

Then, the MCU 10 multiplies the random number k entered from the random number generator 21 by a preset time $t_1$ and executes a timer processing (step 20) to halt the series of processings (steps 16 to 18) by a time corresponding to the multiplication result ($k \times t_1$).

The time $t_1$ may be set to be the period of the reference clock pulse or the one processing time of the MCU 10, whereas the value of the random number k must be varied for each cycle of the series of processings.

Such an arrangement enables the processing time necessary for one complete circulation of speech operation to be randomized according to the value of the random number k.

As a result, with the transceiver control device of the present invention, such a series of pulses having the operational clock frequency $f_c$ as mentioned in connection with the prior art are subjected to a random AM modulation and correspondingly the generation of the frequency spectra is also randomized, so that such frequency spectra ($\pm m/T$) as shown in FIG. 11 can be avoided from generating stationarily.

No generation of such frequency spectra means that the unnecessary radiation, typically beat noise in the speech mode, is suppressed and thus contributes to the realization of a good quality of communication.

Figure 3:
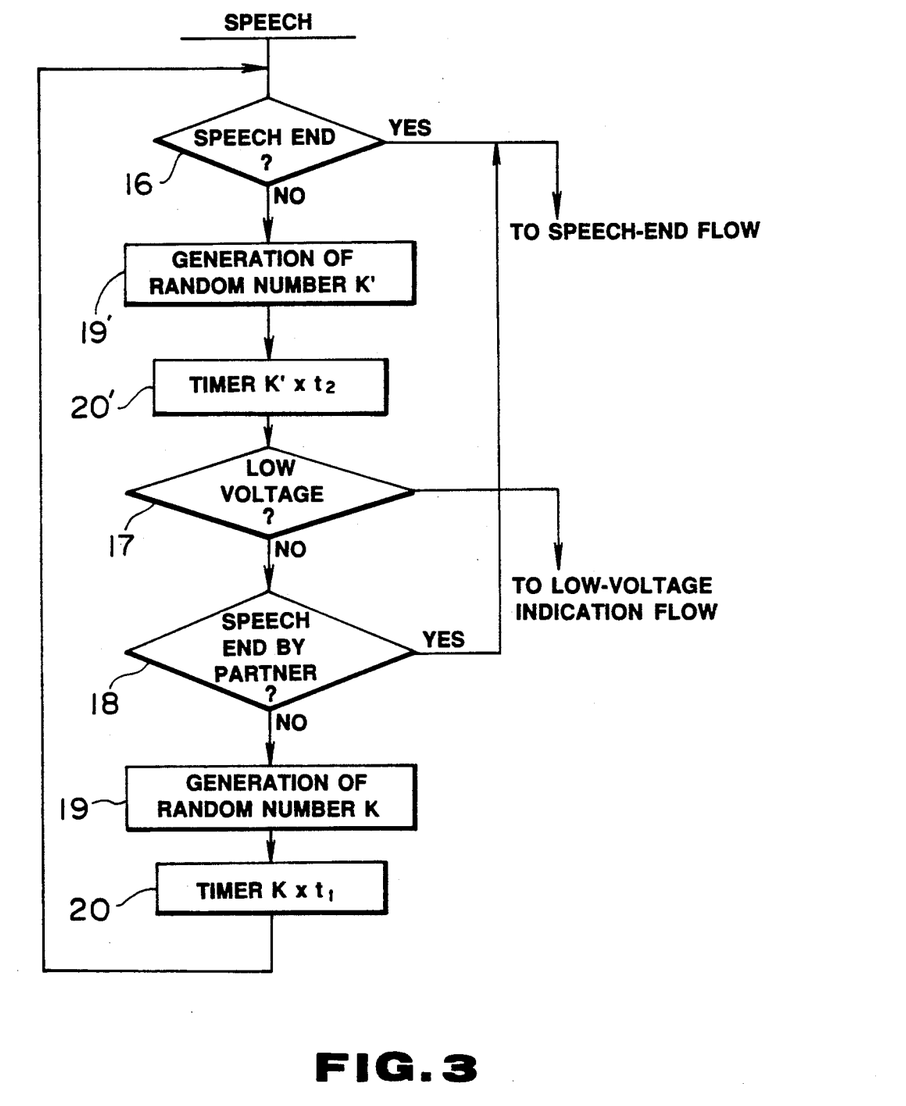
FIGS. 3 to 7 are flowcharts showing other different embodiments of the processing operation of the control device in accordance with the present invention, respectively.

Although the randomizing steps 19 and 20 have been provided at one location of the processing flow, and more particularly, subsequent to the the step 18 in the foregoing embodiment, the present invention is not limited to the particular example but the randomizing steps 19, 20 and 19', 20' may be provided, for example, at two locations, i.e., subsequent to the steps 16 and subsequent to the step 18 respectively as shown in FIG. 3. In FIG. 3, the MCU 10, subsequent to the judgement step 16 of whether or not to terminate the conversation, enters a random number k' from the random number generator 21 (step 19), multiplies the random number k' entered from the random number generator 21 by a preset time $t_2$, and executes a timer processing to halt the series of processings by a time corresponding to the multiplication result (k'$\times t_2$) (step 20). The time $t_1$ is usually not equal to the time $t_2$ but may be set to be equal to the time $t_2$. Further, the randomizing steps have been provided at two locations subsequent to the steps 16 and 18, but the present invention is not limitd to the particular example but the randomizing steps may be provided at a proper number of locations determined by the nature of the employed processing flow.

Furthermore, it does not necessarily require a random number generation to randomize the repetitive period. Such randomization can be achieved by, for example, a predetermined-function generator.

In the latter case, for example, there may be employed such a method that a pseudo random number k' is set to meet a relationship which follows;

$$k' = lB + l + a$$

where l denotes the number of circulation times in the processing loop and a denotes a constant. And when the circulation number l reaches a constant, it is reset at 0 and the constant a is again selected from a plurality of preset constants.

Figure 4:
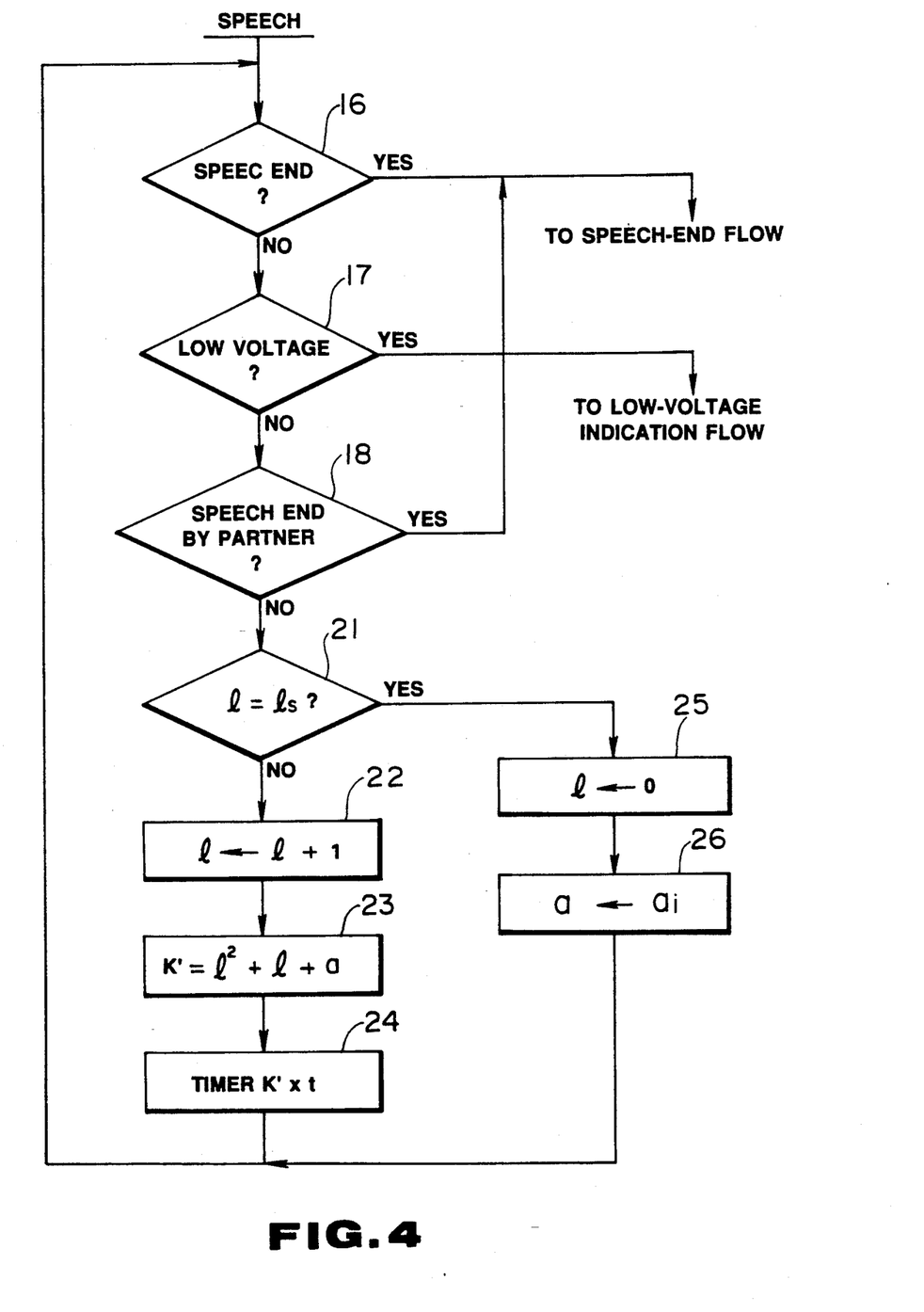

Shown in FIG. 4 is a further embodiment of the present invention having such an arrangement. In the present embodiment, following the step 18 of deciding whether or not for the partner to terminate the conversation, the MCU 10 judges whether or not the the processing loop circulation number l has reached a preset value $l_s$ (l=$l_s$) (step 21). If l$\neq l_s$, then the MCU 10 substitutes the old l for an addition (l+1) as a new l (step 22). And the MCU calculates the following equation with respect to the new l to obtain a pseudo random number k' (step 23):

$$k' = lb + l + a$$

Subsequently, the MCU multiplies the calculated random number k' by a preset time t and executes a timer processing to halt the series of processings by a time (k'$\times$t) corresponding to the calculation result (step 24).

If the MCU decides that l=$l_s$ at the step 21, then it clears the value l to zero (step 25) and then selects one from a plurality of preset constants $a_1$ (i=1, 2, 3...) to again set the selected one as a new a (step 26).

Figure 5:
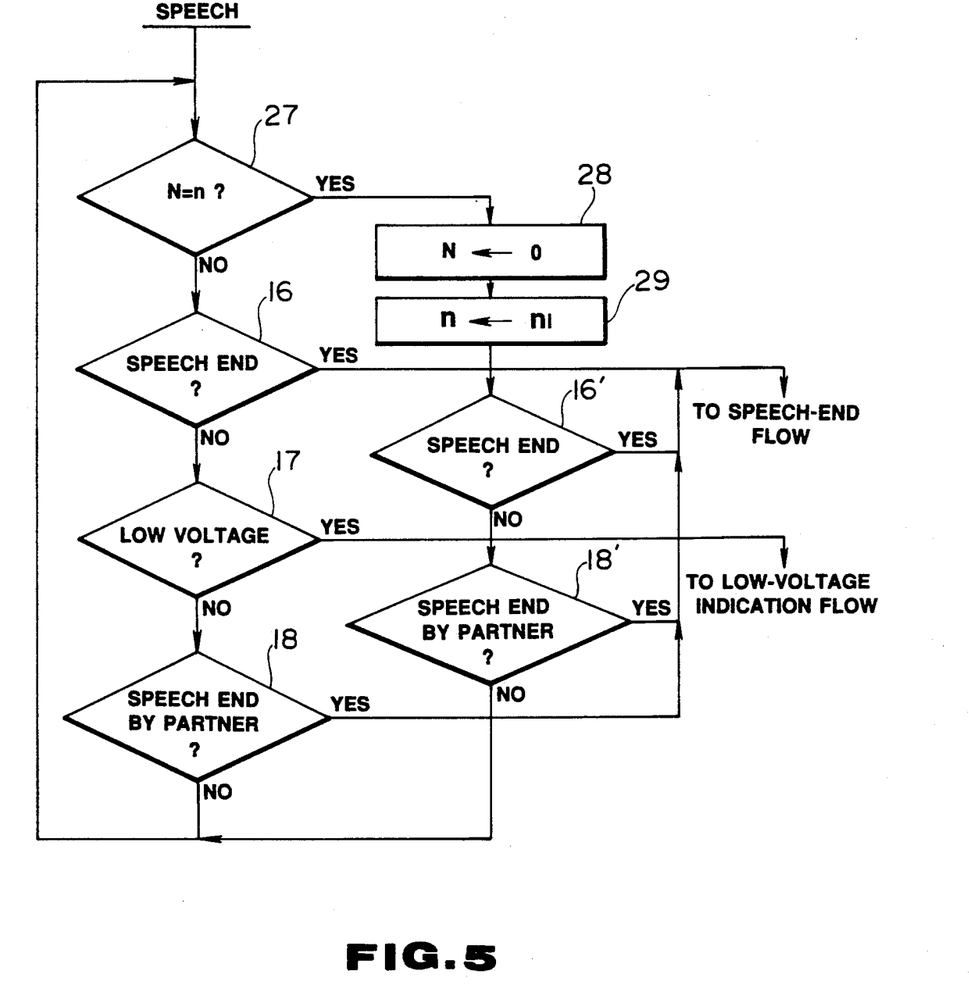
Figure 6:
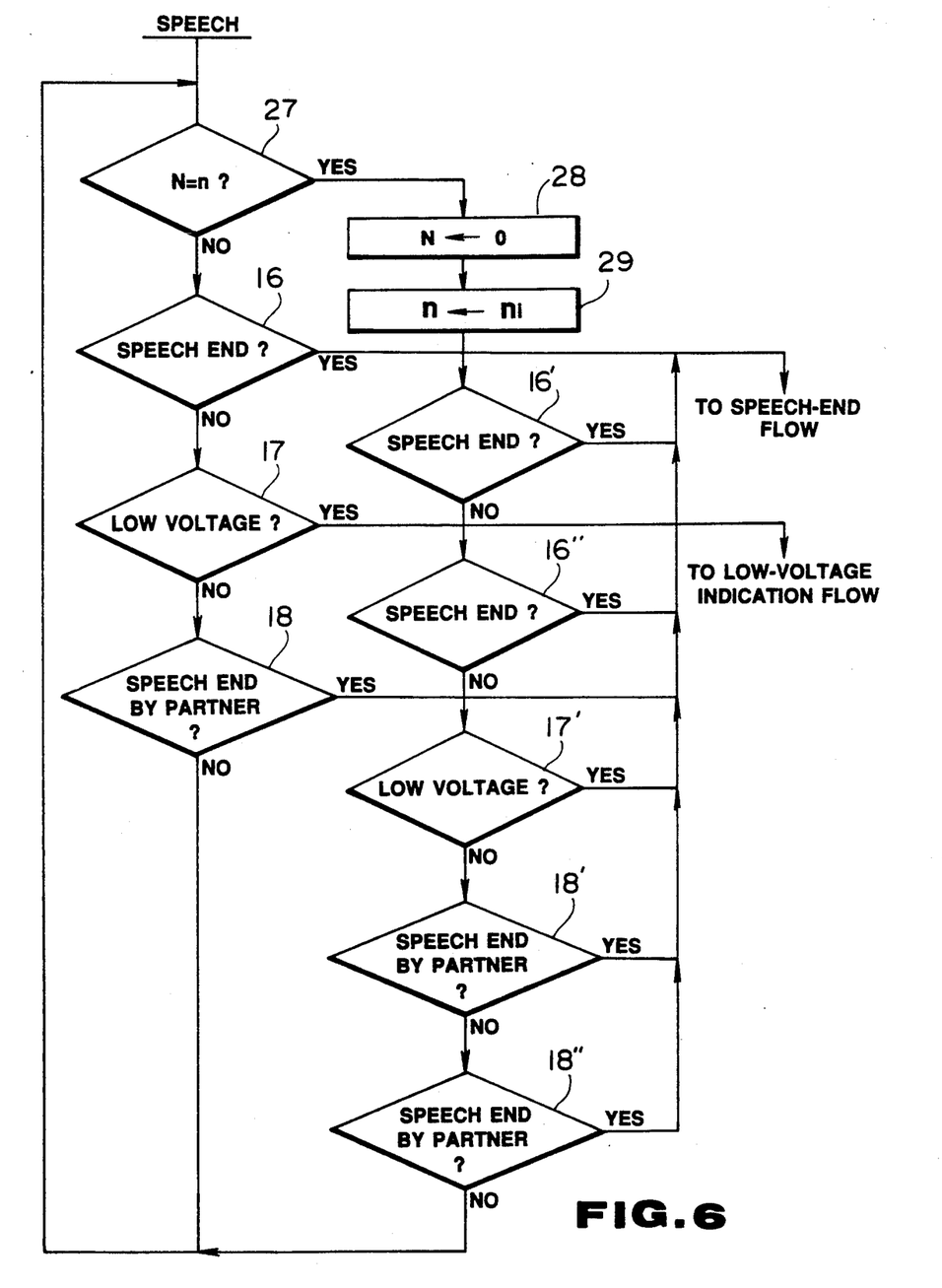

FIGS. 5 and 6 show yet other embodiments of the present invention respectively, in which, each time the number of circulation times in the processing flow reaches a predetermined value, predetermined steps are deleted or added to prevent the repetitive period of the processing flow from becoming constant. More specifically, in the embodiment of FIG. 5, each time the processing-flow circulation number reaches a predetermined value, a step of judging whether or not to be a low voltage is deleted. That is, in FIG. 5, the MCU 10 judges whether or not a processing-flow circulation number N has reached a predetermined value n (N=n) (step 27). If N/n, then the MCU executes the series of processings from the step 16 to the step 18. In other words, the MCU 10 sequentially judges whether or not to cause such a speech ending means (not shown) as a switch to terminate the conversation in the speech mode (step 16), whether or not to provide a low voltage indication on the basis of a detection signal received from the detection circuit 15 (step 17) and then whether or not to terminate the conversation on the basis of a speech end request signal transmitted from the partner transceiver (step 18). And the MCU transfers to the corresponding speech end flow or low voltage indication flow on the basis of the respective judgement results.

When the conversation is normally maintained, the MCU clears the value N to zero (step 28), and then selects one from a plurality of preset constants $n_i$ (i=1, 2, 3...) to again set the selected one as a new n (step 29). Subsequently, the MCU executes steps other than the deleted step of judging whether or not to be a low voltage, that is, the step 16' of judging whether or not to be an end speech and the step 18' of judging whether or not for the partner to terminate the conversation, and then returns to the step 27. Such an arrangement enables the processing-flow one-circulation time to be decreased with the increased n, thus realizing randomization.

The embodiment of FIG. 6 is arranged so that, each time the procesing-flow circulation number reaches a predetermined value, the step of judging whether or not to be a speech end and the step of judging whether or not for the partner to terminate the coversation are repeated respectively twice. In FIG. 6, more specifically, the MCU 10 judges whether or not the processing-flow circulation number N has reached the predetermined value n (N=n) (step 27). If N/n then the MCU executes the series of processings from the step 16 to the step 18. If the MCU judges to be N=n at the step 27 then it clears the value N to 0 (step 28) and then selectss one from a plurality of preset constants $n_i$ (i=1, 2, 3...) to again set the selected one as a new n (step 29). Subsequently, the MCU 10 executes steps 16' and 16'' of judging whether or not to be a speech end and steps 18' and 18'' of judging whether or not for the parnter to terminate the conversation and returns to the step 27. Such an arrangement enables the processing-flow one-circulation time to be increased with the increased n, thus realizing the randomization.

Though the explanation in the foregoing embodiment has been made as to the randomization of the repetitive period carried out by the MCU 10 in the speech mode, the present invention is not restricted to the particular example.

For example, when the MCU 10 is arranged to similarly randomize the repetitive period even in a wait mode, an improvement in the D/U ratio of radio waves in the transceiver receiving a calling signal from the partner transceiver can be expected.

Figure 7:
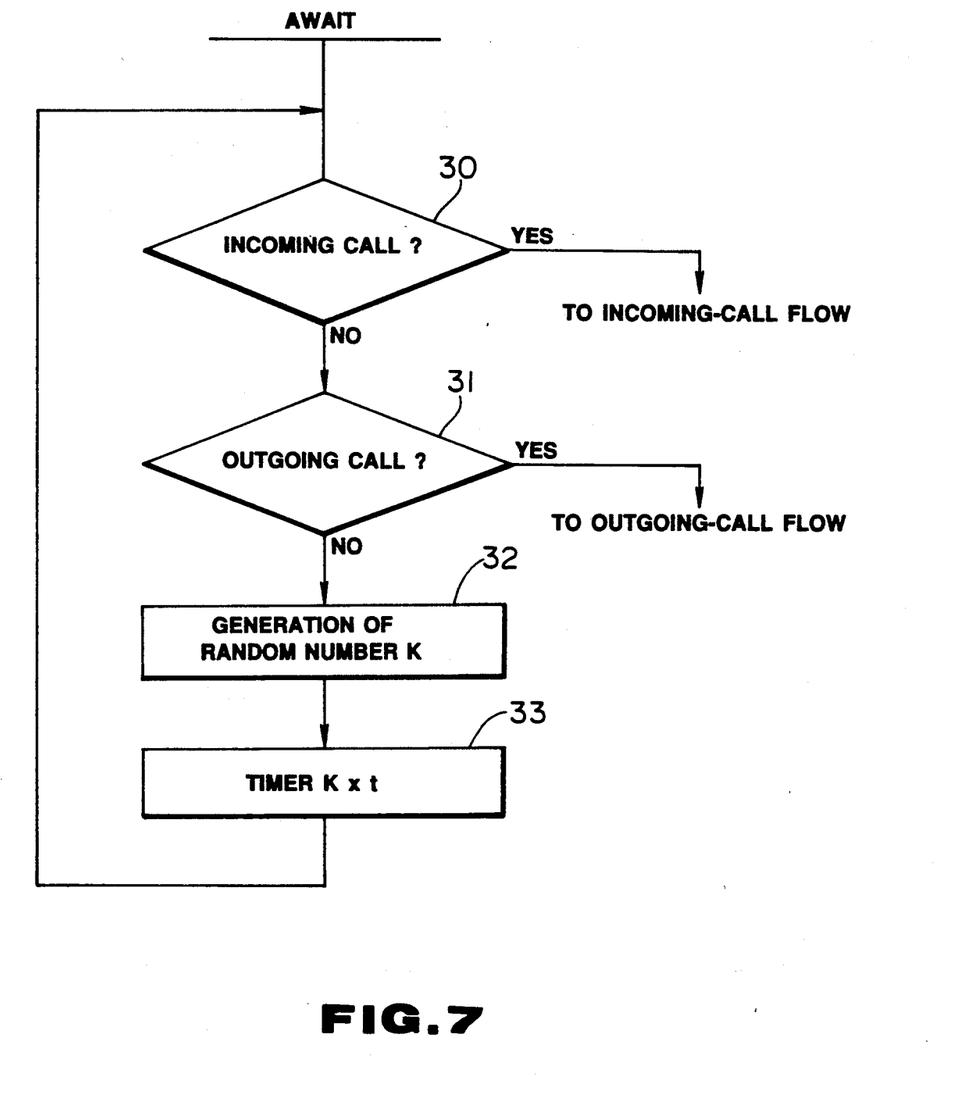

Referring to FIG. 7, there is shown another embodiment which realizes the randomization of the repetitive operational period in a wait mode. More in detail, in the wait mode, the MCU 10 repetitively executes a step 30 of judging whether or not to be an incoming call and a step 31 of judging whether or not to be an outgoing call while reading or writing data through the data buses a, b and c connected between the EPROM 11, IDROM 12 and RAM 13 therefrom or thereinto. If the MCU judges to be an incoming call at the step 30 then it transfers to a predetermined incoming-call flow, whereas if the MCU judges to be an outgoing call at the step 31 then it transfers to a predetermined outgoing-call flow.

The MCU 10, simultaneously with the generation of the random number k from the random number generator 21 (step 32), takes the random number k therein.

Then, the MCU 10 multiplies the random number k taken therein from the random number generator 21 by the preset time t and executes a timer processing (step 33) to halt the series of processings (of the steps 30 and 31) by a time corresponding to the multiplication result (k×t).

With such an arrangement, the processing time necessary for one complete circulation of the wait operation can be subjected to a randomization according to the value of the random number k.

What is claimed is:

1. A control device in a transceiver, said control device coupled to at least one of a transmitter and a receiver in said transceiver and capable of controlling processing steps for establishing a radio communication link between said transceiver and a partner transceiver, comprising:
   a clock source for generating a clock signal having a predetermined frequency;
   control means for performing a predetermined periodic operation by repetitively executing a plurality of said processing steps in synchronism with said clock signal generated at said clock source; and
   period adjusting means for changing a period of said periodic operation performed by said control means, such that said period is not constant.

2. A control device in a transceiver as set forth in claim 1, wherein said period adjusting means includes means for generating a random number each time said periodic operation is performed by said control means and means for changing the period of said periodic operation performed by said control means by a time corresponding to said random number generated at said means for generating a random number.

3. A control device in a transceiver as set forth in claim 2, wherein said means for changing the period changes said period of said periodic operation at a step in a predetermined location of said plurality of processing steps executed by said control means.

4. A control device in a transceiver as set forth in claim 2, wherein said means for changing the period changes said period of said periodic operation at several steps in a plurality of predetermined locations of said plurality of processing steps executed by said control means.

5. A control device in a transceiver as set forth in claim 1, wherein said period adjusting means includes means for generating a value of a predetermined function each time said periodic operation is performed by said control means and means for changing the period of said periodic operation performed by said control means by a time corresponding to said function value generated by said means for generating a value of a predetermined function.

6. A control device in a transceiver as set forth in claim 5, wherein said means for generating a value of a predetermined function includes means for counting the number of repetition times of said periodic operation performed by said control means to obtain a count value and to generate said function value as a variable of the count value of said means for counting.

7. A control device in a transceiver as set forth in claim 6, wherein said means for generating a value of a predetermined function includes means for resetting said count value each time the count value of said means for counting reaches a predetermined value.

8. A control device in a transceiver as set forth in claim 5, wherein said means for generating a value of a predetermined function includes means for modifying a function equation each time the count value of said means for counting reaches a predetermined value.

9. A control device in a transceiver as set forth in claim 5, wherein said means for generating a value of a predetermined function and said means for changing the period generate the value of said function and change said period of said periodic operation at a step in a predetermined location of said plurality of processing steps executed by said control means.

10. A control device in a transceiver as set forth in claim 1, wherein said period adjusting means includes means for counting the number of repetition times of said periodic operation performed by said control means to obtain a count value and means for modifying the number of said plurality of processing steps in accordance with the count value of said counting means.

11. A control device in a transceiver as set forth in claim 10, wherein said modifying means removes a predetermined one of said plurality of processing steps.

12. A control device in a transceiver as set forth in claim 10, wherein said modifying means adds another step to said plurality of processing steps.

13. A control device in a transceiver as set forth in claim 10, wherein said modifying means repeatedly performs a particular one of said plurality of processing steps a predetermined number of times.

14. A control device in a transceiver as set forth in claim 1, wherein said period adjusting means includes means for counting the number of repetition times of said periodic operation performed by said control means to obtain a count value and means for changing the number of said plurality of processing steps each time the count value of said counting means reaches a predetermined value.

15. A control device in a transceiver as set forth in claim 14, wherein said predetermined value is modified each time the count value of said counting means reaches the predetermined value.

* * * * *